March 30, 1954
E. M. BIRD
2,673,483
ADAPTABLE SAFETY BRAKE SYSTEM
Filed May 9, 1949
3 Sheets-Sheet 1
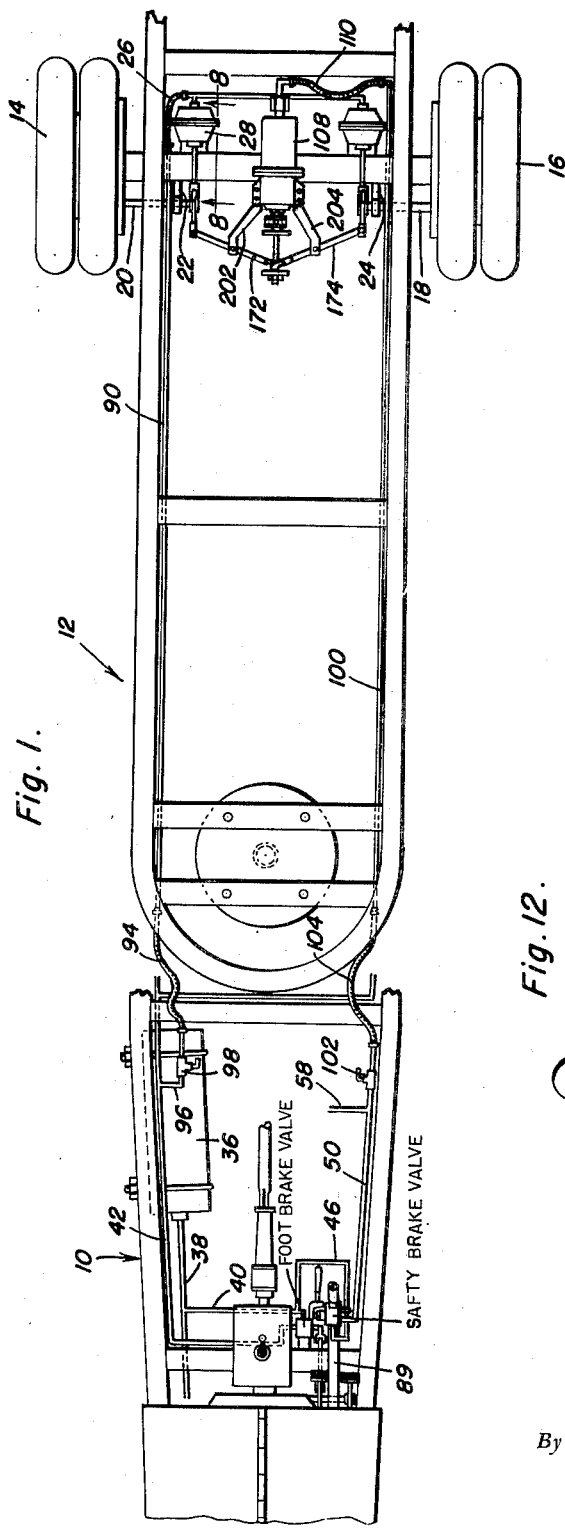
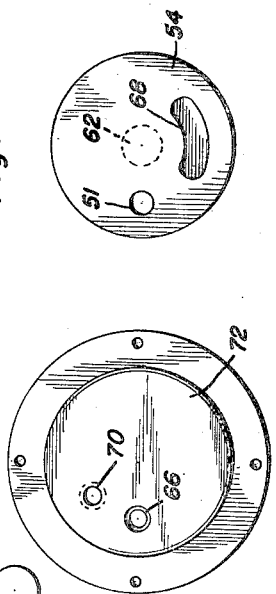
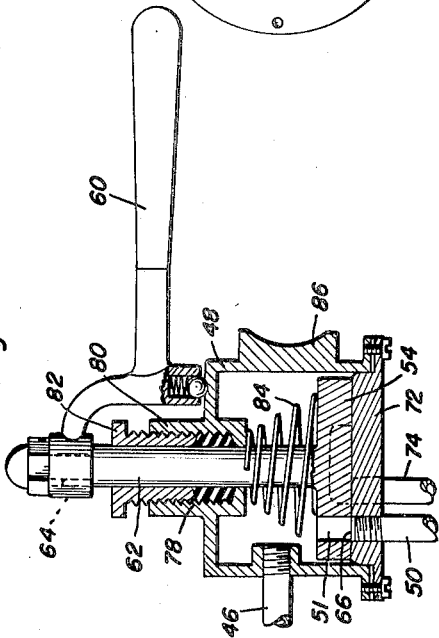
Inventor
Ernest M. Bird
By Clarence A. O'Brien
and Harvey B. Jacobson
Attorneys March 30, 1954 E. M. BIRD 2,673,483
ADAPTABLE SAFETY BRAKE SYSTEM
Filed May 9, 1949 3 Sheets-Sheet 2
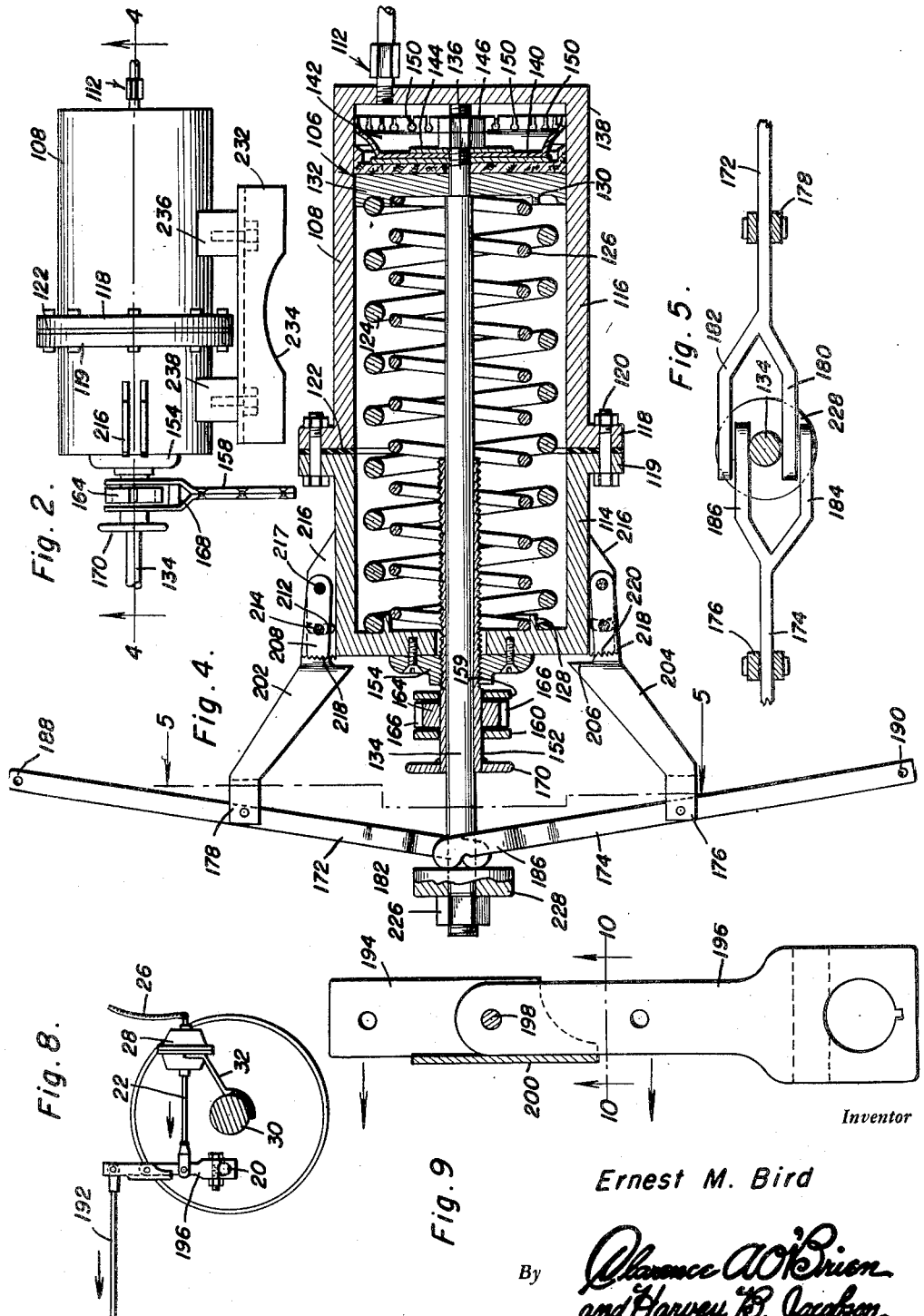
Inventor
Ernest M. Bird
By Clarence A. O'Brien
and Harvey B. Jacobson
Attorneys

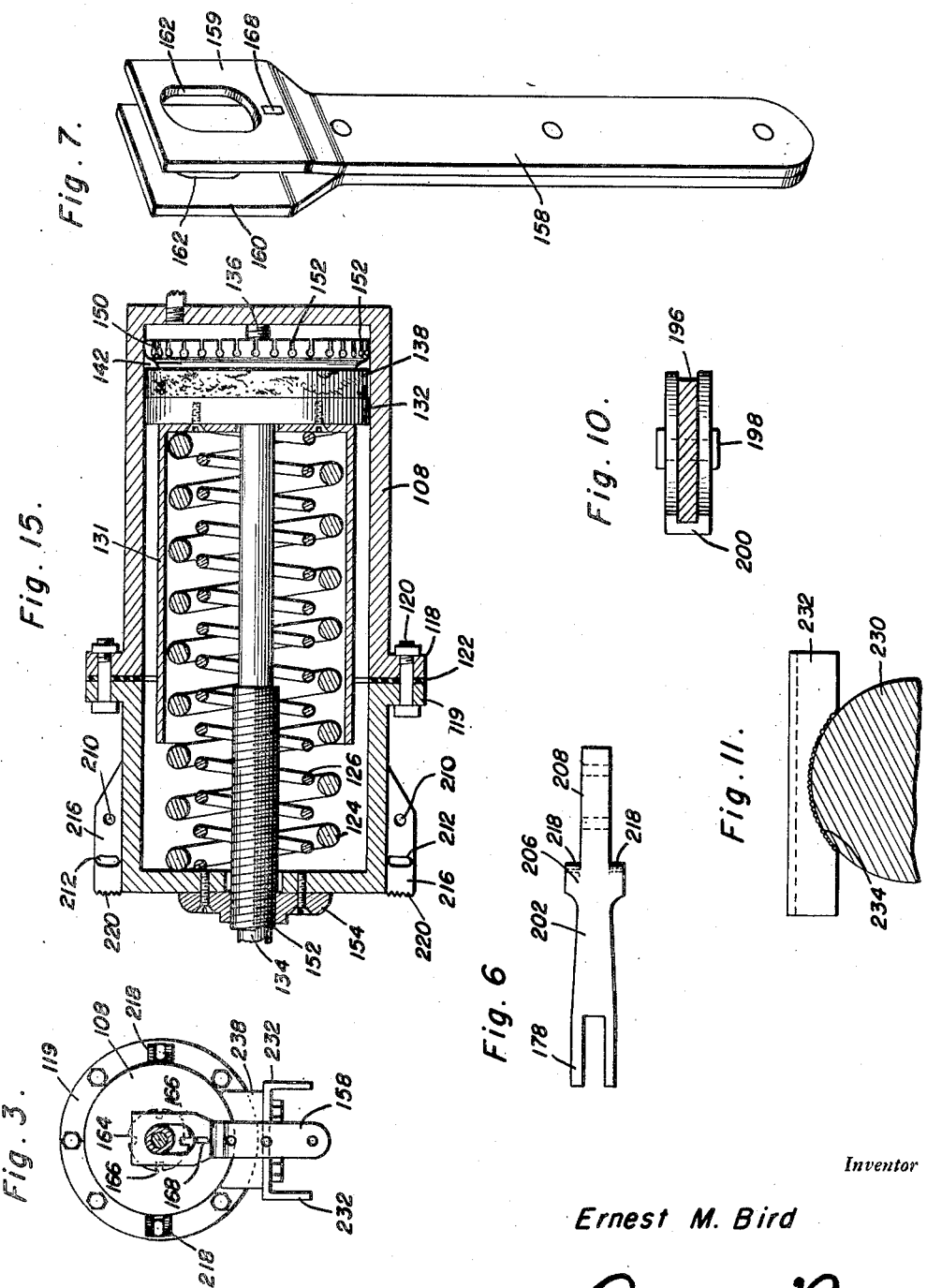

Patented Mar. 30, 1954

2,673,483

UNITED STATES PATENT OFFICE 2,673,483

ADAPTABLE SAFETY BRAKE SYSTEM

Ernest M. Bird, Scranton, Pa., assignor to Premier Saf-Brake Co., Inc., Scranton, Pa., a corporation of Pennsylvania Application May 9, 1949, Serial No. 92,238

1 Claim. (Cl. 74—522)

This invention relates to novel and useful improvements in brake systems for vehicles.

An object of this invention is to adapt a safety brake system for various types of vehicles and for varying strokes of links cooperating with the brake cylinder piston rod.

Another object of this invention is to apply the brakes of the vehicle by operating the brake cam shafts so as to urge the brake shoes against the brake drums in response to a relatively low pressure in the conventional fluid pressure operated brake systems.

Another object of this invention is to apply the brake shoe of a vehicle in response to low pressure occasioned by failure, or occasioned purposely, within the brake system of the vehicle whereby a pair of concentrically disposed springs within a cylinder which react on a piston are allowed to operate an improved series of links for ultimately actuating the brake cam shaft or other equivalent brake elements in the system.

A still further purpose of this invention is to improve the general operation of the brake system of a truck or other vehicle whereby one or more wheels of the vehicle may be held in place for one reason or another, as when repairing the vehicle or coupling a tractor to a trailer, the holding action taking place through the operation of a major spring and a servo spring reacting on a piston, the piston being disposed in the cylinder suitably mounted on the vehicle under discussion.

And another object of this invention is to release the brakes after they have been spring-applied by manual means so that the vehicle may be moved under its own power, relying on the emergency or safety brake system for emergency travel to a stop.

Other objects and features of novelty will become apparent to those skilled in the art, in following the description of the preferred form of the invention, illustrated in the accompanying drawings, wherein:

Figure 1 is a plan schematic view of a typical tractor and trailer, portions of the conventional structure being omitted in order that the improved brake system attachment may be readily apparent;

Figure 2 is an elevational detail of construction showing the cylinder and its attaching members for the rear axle of a trailer as well as the means for manually operating the piston rod to overcome the force of the springs shown in Figures 15 and 4;

Figure 3 is primarily a plan view of the device shown in Figure 2, the piston rod being shown in section;

Figure 4 is a longitudinal sectional view taken on the line 4—4 of Figure 2 and in the direction of the arrows;

Figure 5 is a transverse sectional view showing the arrangement of linkages of Figure 4 and taken substantially on the line 5—5 of Figure 4 and in the direction of the arrows;

Figure 6 is a plan view of one of the links forming a part of the improved linkage construction;

Figure 7 is a perspective view of the operator for overcoming the force of the spring in releasing the shoes from the drums after they have been operated by means of the said springs;

Figure 8 is a sectional view taken substantially on the line 8—8 of Figure 1 and in enlarged detail to show portions of the system;

Figure 9 is an enlarged elevational view of one of the links forming a part of the linkage construction, the stop for this particular linkage being shown in section;

Figure 10 is a sectional view taken on a line 10—10 of Figure 9 and in the direction of the arrows;

Figure 11 is a sectional view of the rear axle having a bracket mounted thereon for connection with the supports shown in Figure 2;

Figure 12 is a sectional view of a special valve used in connection with the safety brake system;

Figure 13 is an elevational view of one of the valve members;

Figure 14 is an elevational view of another of the valve members; and

Figure 15 is a longitudinal sectional view of a modification of the cylinder-piston arrangement.

The present invention has adaptation in various environments, but is particularly useful in connection with trucks, and specifically those which include tractors and trailers. There have been known, and in the prior art there are brake systems which operate on the auxiliary principle. They are operative in response to failures of one sort or another. The present invention, to the best of my knowledge, incorporates various structural improvements over what has been done in the prior art, and particularly over my prior Patent No. 1,997,807.

Reference is made to Figure 1, wherein a conventional tractor 10 is illustrated (portions thereof being omitted) and a conventional trailer 12 is shown partially coupled thereto. The trailer has rear wheels 14 and 16, respectively, and brake drums and brake shoes (not shown). The drums and shoes are purely conventional in nature and are in no way modified by utility of the present device. The brake cam shafts 20 and 18, respectively, extend from the back plates of the immediate brake assemblies and are connected for operation by means of the usual operators 22 and 24 (Figure 8). These operators are, in turn, connected with the diaphragm-housings 28 receiving fluid (air or liquid) under pressure through the inlet line 26. Each side of the vehicle has an identical structure, as clearly evident from an inspection of Figure 1. Further, the diaphragm-piston motors 28 are attached to the axle 30 of the trailer 12 by any suitable means found conventional in the art, such as a bracket 32.

Mounted on the tractor is a pressure tank 36 having various lines operatively associated therewith. An air pressure inlet line 38 is attached thereto at one end and is adapted to be secured to a pump not shown. Secured to the line 38 is a branch 40 which is operatively associated with the foot brake pedal operated valve in order to permit fluid (either air or an aqueous or petroleum mixture or solution) to be urged under pressure to the line 42. The line 42 is adapted for connection with the wheel not shown of the tractor.

Also operatively connected with the line 40 is a conduit 46 which terminates in a valve housing 48. This line introduces fluid under pressure into the housing 48 for operating the brakes of the vehicle by means of fluid pressure. Accordingly, when the valve is set, as disclosed in Figure 12, the fluid under pressure enters the housing 48 through the conduit 46 and is exhausted through the line 50, since the port 52 of the valve head 54 is aligned with the discharge openings in the pipe or line 50. Since this line 50 has a branch 58 therein attaching to the trailer safety brake, the trailer brake may be operated by a manipulation of the handle 60 of the said valve as shown in Figure 12.

However, when the handle 60 is operated a larger amount, the shank 62 is rotated through the medium of the pin and slot connection generally indicated at 64 in order to turn the valve head 54 so that the discharge opening 66 is closed by the head 54. This permits no flow through the housing 48. Upon rotation of the handle 60 a larger amount, the slot 68 is communicated with the opening 66 and also the opening 70 provided in the bottom 72 of the housing 48. Hence, fluid flows through the line 50 and also through the line 74 which is in communication with the opening 70. This last-mentioned line is operatively connected with the inlet line 46 so that a by-pass arrangement results.

In order to maintain the valve in the proper assembled form, suitable packing 78 is provided in an internally threaded sleeve 80 which is carried by the housing 48 and a collar 82 which is externally threaded is disposed in the threaded portion of the sleeve, compressing the packing and forming an effective seal for the shank 62. A spring 84 reacts on the plunger head 54 and also the bottom of the sleeve 80, thereby constantly urging the plunger head against the bottom 72 of the housing 48. In order to suitably mount the housing 48, an arcuate surface member 86 is disposed on the housing, whereby the housing may be fixed to the steering column 89 of the vehicle.

For operating the rear brake shoes of the trailer 12, a conduit 90 is fixed in a suitable manner to the trailer and is attached to the brake line 42 through the intermediate structure of a flexible hose 94 and a rigid length of hose 96 which has a valve 98 disposed therein. Accordingly, in order to remove the trailer from the tractor, it is only necessary to close the valve 98 and then unfasten the flexible length of hose 94. Also, it is apparent that upon normal operation of the brake system, fluid under pressure is urged through the line 42 and, consequently, through the line 90, and ultimately through the line 26 for actuation of the servo motor units.

On the other side (preferably) of the trailer 12 there is a line 100 which is attached to the said line 50 downstream of the branch 58. A valve 102 is disposed in the line 50 between the branch 58 and the flexible hose portion 104 which attaches the line 50 with the conduit or line 100. The said line 100 is used for the purpose of operating the piston 106 which is disposed in the cylinder 108 (Figures 4 and 15). A length of flexible hose 110 extends from the rear end of the line 100 and terminates in a conventional coupling type inlet, generally indicated at 112, and seen best in Figure 4.

The said cylinder 108 is preferably composed of two complemental sections 114 and 116 which are connected together by means of bolts, rivets or the like 120 passing through the flanges 118 and 119 of the sections. A gasket 122 is interposed between the sections in order to maintain the cylinder in the substantially air-tight condition.

A main spring 124, together with a servo spring 126 which is in concentric relationship therewith, is disposed in the cylinder 108. A small lip 128 is fixed at the bottom of the cylinder, serving as a seat and centering device for both of the springs, and a similar small lip 130 is disposed on the under surface of the piston disk 132 forming a part of the said piston generally indicated at 106. The sleeve-type spring guide 131 is fixed to the piston in lieu of the lip 130 in the modification of Figure 15. A piston rod 134 has a reduced shank 136 at one end with the main plate 132 disposed thereon and operatively engaging the shoulder at the junction of the shank 136 and the larger part (diameter) of the piston rod 134. A fiber or leather wiper 138 forms another part of the said piston 106 and is disposed on the main plate 132. A metallic washer 140 is disposed on the said fiber or leather member 138 and a metallic de-icer type wiper 142 is disposed thereon. Mounted on the de-icer member 42 is another washer 144 which has a pair of nuts 146 thereon holding all of the elements in assembled relationship. It will be noted that the end of the shank 136 projects an appreciable amount past the nuts 146 whereby the said end may act as a stop when it engages the outer end of the cylinder. This prevents damage to the ends of the resilient material de-icer or wiper 142.

A number of slots 150 are formed in the skirt of the de-icer, thereby forming resilient fingers which scrape on the inside surface of the cylinder 108. The operation and utility of the de-icer is in its obvious capacity of keeping the interior of the cylinder in a cleanly condition.

Disposed on the piston rod 134 is an externally threaded sleeve 152 which passes through a suitable opening in the bottom end of the cylinder 108 and which is threadedly disposed in a boss 154. This boss is fixed to the cylinder so that it is immovable with respect to the sleeve and the piston rod. Since the sleeve 152 is disposed on the piston rod 134 and threaded on the boss, rotation of the sleeve moves the sleeve outwardly of the cylinder. Means for performing this function by manual operation is provided. Reference is made to Figure 7 which shows a handle 158 having bifurcations 159 and 160 at one end thereof. Each bifurcation has a slot 162 therein which is disposed on the collar 164 having peripheral notches 166 therein. These notches are engaged by the lug 168 which passes between the bifurcations 159 and 160. Since the slots 162 have the collar 164 loosely disposed therein, the lug or tongue 168 is selectively disposed in the slots, whereby upon rotative movement of the handle 158, the sleeve is operated inwardly or outwardly of the cylinder. A stop 170 is disposed on the outer end of the sleeve 152 for engagement by the ends of the links 172 and 174, respectively.

These links are pivoted intermediate their ends in the yokes 176 and 178 (Figure 5) and the links themselves have bifurcations 180, 182 and 184, 186 at one pair of ends. The opposite pair of ends are apertured as at 188 and 190, respectively, for pivotal connection with links 192 (Figure 8) which have adjustable turnbuckles or couplings at their ends thereof.

Reference to Figure 9 illustrates a linkage connection operatively associated with the link 192. There are two of such linkage connections provided as disclosed in Figure 1. Each consists of a pitman 194 connected at one end with the link 192 and connected adjacent the other end with an arm 196 through the medium of a pivot pin 198. A stop 200 which is in the form of a flange fixed to the pitman 194 is provided for connection with an edge surface of the arm 196. This allows limited pivotal movement between the arm 196 and the pitman 198 whereby movement may be transmitted from the links 172 and 174, respectively, in one direction. Movement in the other direction will simply result in mutual pivotal movement between the pitman 194 and the arm 196.

The lower end of the arm 196 is operatively connected with the brake cam shafts 20 for operation thereof and, in order to operate the same cam shafts 20 by means of the fluid pressure system, the operator 22 is attached to the arm 196 intermediate the ends thereof (Figure 8). Fixing the said links 172 and 174, respectively, for pivotal movement is a pair of brackets 202 and 204, seen in Fig. 6. Each bracket 202 and 204, respectively, is of identical construction. There is a stop or shoulder 206 formed intermediate its ends and at one end there is a yoke. A reduced portion 208 is provided at the opposite end having two openings therein. Pins 214 and 217 are passed through these openings. The pin 214 is further passed through a pair of arcuate slots 212 in spaced ears 216, while the pin 217 which passes through the other opening is disposed in openings 210 in the ears or brackets 216. Through this structural expedient, the brackets or arms 202 and 204, respectively, are mounted for adjustment. Serrations 218 are supplied adjacent the shoulder 206 which are enmeshed with serrations 220 supplied at the outer ends of the ears 216. Hence, once the arms 202 and 204 are adjusted they are maintained in the fixed adjusted position. The adjustment is obvious in its utility of compensating for the stroke and actual position of the links 172 and 174, respectively. To make the adjustment, the pins 214 and 217 are removed from the ears 216 and the serrations 218 of the arms are enmeshed in the desired position with the serrations 220 of the forward edges of the ears 216, after which the pins 214 and 217 are re-inserted.

In operation, the piston 106 is maintained in the position opposite that shown in Figure 4 by means of air pressure in the brake system. This maintains the springs in the compressed position and urges the stop 170 against the bifurcations 180, 182, and 184, 186. Hence, the arms are maintained normally in the outward position at the bifurcations thereof. A nut 226 and a thrust bearing 228 is carried by the outer end of the piston rod 134 also forming a seat for the bifurcations. When a failure in the line of the conventional brake system occurs or when it is desired to apply the brakes in the trailer by another means, the springs 124 and 126 which are under compression are allowed to push the piston 106 inwardly until the end of the reduced shank 136 engages the back end of the cylinder. This carries the thrust bearing 228 with the piston rod, thereby operating the links 174 and 172 pivotally about the yokes 176 and 178, respectively. This in turn is reflected through the various linkages in rotative movement of the brake cam shafts in order to apply the brakes.

In order to release the brakes, it is only necessary to operate the handle 158 to pull the piston inwardly of the cylinder. Thus, the stop 170 pushes the arms 174 and 172 pivotally about the yokes 176 and 178.

In order to mount the cylinder 108, a pair of special brackets are provided. These brackets are in part secured to the rear axle 230 (Figure 11) and include angle irons 232 having a cut-out portion 234 adapted to fit the contour of the axle 230. Supports 236 and 238, respectively, are fixed by means of bolts to the flanges of the angle irons 232 and are fixed to the exterior surface of the cylinder 108.

It is apparent that variations may be made without departing from the spirit of the invention.

Having described the invention, what is claimed as new is:

In a fluid operated vehicle brake system, a safety brake engaging mechanism for engaging the brakes responsive to a loss of fluid in the system including a cylinder having front and rear ends, a piston disposed in said cylinder, spring means abutting the front end of said cylinder and urging said piston toward the rear end thereof, a piston rod secured to said piston and extending slidably through the front end of said cylinder, a boss on the front of said cylinder surrounding said piston rod, a sleeve threaded through said boss and slidably embracing said piston rod, a stop on the front end of said sleeve, a stop on the front of said piston rod, diametrically opposite ears on said cylinder adjacent the front end thereof, arms fixed to said ears and extending forwardly therefrom, links pivotally secured at their central portions to the free ends of said arms, one pair of ends of said links being bifurcated and received over said piston rod between said stops, cooperating means on said arms and said ears for adjustably securing the free ends of said arms at varying distances toward and away from said piston rod, said cooperating means including a serrated edge on each ear, and an offset shoulder on each arm engaging the serrated edge of an associated ear, a pair of removable, longitudinally spaced pins on each ear securing an arm thereto, each ear having opposed arcuate slots therein through which one of said pins extends to permit selective securement of said arms in adjusted positions.

ERNEST M. BIRD.

References Cited in the file of this patent

UNITED STATES PATENTS

| Number | Name | Date |
|---|---|---|
| 1,255,220 | Petry | Feb. 5, 1918 |
| 1,650,286 | Livingston | Nov. 22, 1927 |
| 1,880,004 | Worswick | Sept. 27, 1932 |
| 1,997,807 | Bird | Apr. 16, 1935 |
| 2,165,460 | Desing | July 11, 1939 |
| 2,220,822 | Grad | Nov. 5, 1940 |
| 2,311,842 | Larson | Feb. 23, 1943 |
| 2,448,419 | Coulter | Aug. 31, 1948 |
| 2,484,551 | Brouse | Oct. 11, 1949 |